(12) United States Patent
Roth

(10) Patent No.: US 7,658,044 B2
(45) Date of Patent: Feb. 9, 2010

(54) GAP COVERING FOR CABIN PANELS

(75) Inventor: Ingo Roth, Hamburg (DE)

(73) Assignee: Airbus Deutschland GmbH, Hamburg (DE)

(*) Notice: Subject to any disclaimer, the term of this patent is extended or adjusted under 35 U.S.C. 154(b) by 209 days.

(21) Appl. No.: 11/734,337

(22) Filed: Apr. 12, 2007

(65) Prior Publication Data

US 2008/0282636 A1 Nov. 20, 2008

Related U.S. Application Data

(60) Provisional application No. 60/744,677, filed on Apr. 12, 2006.

(30) Foreign Application Priority Data

Apr. 12, 2006 (DE) .................. 10 2006 017 241

(51) Int. Cl.
*E04B 1/68* (2006.01)
(52) U.S. Cl. .............. 52/396.04; 52/395; 52/459; 244/119; 244/131; 277/637; 403/331
(58) Field of Classification Search .......... 52/395, 52/396.04, 459, 461, 464, 468, 470, 472, 52/396.05, 396.07, 396.1, 584.1; 244/119, 244/131; 277/637, 644, 652; 403/329, 252, 403/253, 254, 255, 331
See application file for complete search history.

(56) References Cited

U.S. PATENT DOCUMENTS

| | | | | |
|---|---|---|---|---|
| 924,355 A * | 6/1909 | Howard | ...... | 52/712 |
| 1,185,014 A * | 5/1916 | Shea | ...... | 52/472 |
| 1,549,721 A * | 8/1925 | Kraft | ...... | 220/685 |
| 1,728,873 A * | 9/1929 | Masury | ...... | 296/29 |
| 1,730,464 A * | 10/1929 | Levine | ...... | 52/584.1 |
| 1,772,417 A * | 8/1930 | Ellinwood | ...... | 52/461 |
| 1,821,320 A * | 9/1931 | Plummer | ...... | 114/292 |
| 1,865,674 A * | 7/1932 | Carter | ...... | 52/459 |
| 1,919,780 A * | 7/1933 | Fairbank | ...... | 52/584.1 |
| 1,971,320 A * | 8/1934 | Cederquist | ...... | 52/584.1 |
| 2,189,159 A * | 2/1940 | Anschicks | ...... | 52/461 |
| 2,220,628 A * | 11/1940 | Stedman | ...... | 404/47 |
| 2,232,762 A * | 2/1941 | Batcheller | ...... | 52/468 |
| 2,251,584 A * | 8/1941 | Fageol et al. | ...... | 280/403 |
| 2,311,191 A * | 2/1943 | Sherwood | ...... | 52/395 |
| 2,339,865 A * | 1/1944 | Larmour | ...... | 52/464 |
| 2,379,179 A * | 6/1945 | Petersen | ...... | 52/282.1 |

(Continued)

FOREIGN PATENT DOCUMENTS

DE 9406302.8 U1 6/1995

(Continued)

*Primary Examiner*—Robert J Canfield
*Assistant Examiner*—Matthew J Gitlin
(74) *Attorney, Agent, or Firm*—Christopher Paradies; Fowler White Boggs P.A.

(57) ABSTRACT

Currently, piping tapes are used as elastic masking elements of joints between lateral panels in an aircraft. According to one embodiment, a gap covering for cabin panels in an aircraft is provided, where the gap covering comprises a flexible cover region that is arranged between the cabin panels and finishes off so as to be substantially flush with surfaces of the panels. In this way, a lightweight economical gap covering which covers gaps in an effective and attractive manner and provides protection against injury is provided.

10 Claims, 7 Drawing Sheets

U.S. PATENT DOCUMENTS

| | | | | |
|---|---|---|---|---|
| 2,405,643 A | * | 8/1946 | Crot | 52/465 |
| 2,438,140 A | * | 3/1948 | Auten | 52/464 |
| 2,581,625 A | * | 1/1952 | Brady | 244/129.1 |
| 2,615,212 A | * | 10/1952 | Beck | 312/1 |
| 2,638,162 A | * | 5/1953 | Heitlinger et al. | 160/38 |
| 2,796,624 A | * | 6/1957 | Speer | 16/16 |
| 2,822,588 A | * | 2/1958 | West | 52/773 |
| 2,990,650 A | * | 7/1961 | Attwood | 52/468 |
| 3,085,301 A | * | 4/1963 | Nuorivaara | 29/525.03 |
| 3,300,913 A | * | 1/1967 | Patry et al. | 52/58 |
| 3,323,819 A | * | 6/1967 | Barker | 403/402 |
| 3,324,774 A | * | 6/1967 | Boschi | 404/47 |
| 3,363,383 A | * | 1/1968 | La Barge | 52/471 |
| 3,460,860 A | * | 8/1969 | Stevens, Jr. | 52/584.1 |
| 3,759,005 A | * | 9/1973 | Smith | 52/396.04 |
| 3,760,544 A | * | 9/1973 | Hawes et al. | 52/468 |
| 3,862,810 A | * | 1/1975 | Welch | 404/66 |
| 3,994,609 A | * | 11/1976 | Puccio | 404/69 |
| 4,292,774 A | * | 10/1981 | Mairle | 52/208 |
| 4,300,323 A | * | 11/1981 | Meechan et al. | 52/464 |
| 4,307,974 A | * | 12/1981 | George | 404/68 |
| 4,366,656 A | * | 1/1983 | Simpson | 52/395 |
| 4,385,850 A | * | 5/1983 | Bobath | 403/205 |
| 4,403,362 A | * | 9/1983 | Durrant | 14/71.1 |
| 4,435,935 A | * | 3/1984 | Larrea | 52/461 |
| 4,455,803 A | * | 6/1984 | Kornberger | 52/395 |
| 4,461,131 A | * | 7/1984 | Pressell | 52/395 |
| 4,481,747 A | * | 11/1984 | Tengesdal et al. | 52/460 |
| 4,572,702 A | * | 2/1986 | Bone | 404/65 |
| 4,599,841 A | * | 7/1986 | Haid | 52/396.04 |
| 4,685,825 A | * | 8/1987 | Buckenauer | 404/65 |
| 4,773,791 A | * | 9/1988 | Hartkorn | 404/68 |
| 4,781,004 A | * | 11/1988 | Hartman | 52/464 |
| 4,930,279 A | * | 6/1990 | Bart et al. | 52/466 |
| 5,007,221 A | * | 4/1991 | Matthews et al. | 52/464 |
| 5,065,960 A | * | 11/1991 | Castellucci | 244/131 |
| 5,155,952 A | * | 10/1992 | Herwegh et al. | 52/100 |
| 5,695,154 A | * | 12/1997 | Castellucci et al. | 244/130 |
| 5,979,828 A | * | 11/1999 | Gruensfelder et al. | 244/129.1 |
| 6,042,296 A | * | 3/2000 | Wittig et al. | 403/298 |
| 6,088,983 A | * | 7/2000 | Applebee | 52/282.1 |
| 6,170,212 B1 | * | 1/2001 | Suchyna et al. | 52/480 |
| 6,219,982 B1 | * | 4/2001 | Eyring | 52/396.04 |
| 6,345,480 B1 | * | 2/2002 | Kemper et al. | 52/395 |
| 6,550,205 B2 | * | 4/2003 | Neuhofer, Jr. | 52/464 |
| 7,478,781 B2 | * | 1/2009 | Granzeier et al. | 244/131 |
| 2002/0059764 A1 | * | 5/2002 | Schluter | 52/396.04 |
| 2002/0095895 A1 | * | 7/2002 | Daly et al. | 52/464 |
| 2004/0080121 A1 | * | 4/2004 | Fieger et al. | 277/628 |
| 2005/0072087 A1 | * | 4/2005 | Fanucci et al. | 52/459 |

FOREIGN PATENT DOCUMENTS

| | | |
|---|---|---|
| DE | 102004049893 A1 | 4/2006 |
| EP | 1468907 A2 | 10/2004 |
| GB | 2287517 A | 9/1995 |

* cited by examiner

GAP COVERING FOR CABIN PANELS

REFERENCE TO RELATED APPLICATIONS

This application claims the benefit of the filing date of U.S. Provisional Patent Application No. 60/744,677 filed Apr. 12, 2006, and of the German Patent Application No. 10 2006 017 241.8 filed Apr. 12, 2006, the disclosures of which are hereby incorporated herein by reference.

FIELD OF THE INVENTION

The field relates to gap coverings for aircraft. In particular the field relates to a gap covering for cabin panels in an aircraft, a method for installing paneling elements in an aircraft, the use of gap covering in an aircraft, and an aircraft with corresponding gap covering.

BACKGROUND OF THE INVENTION

In aircraft, interior fittings for example, ceiling- or wall panels, are fastened to the primary structure or to other structural aircraft elements by means of correspondingly held retention- or fastening elements. During flight, the aircraft's fuselage deforms to a significant extent, for example, as a result of differences in pressure. Thus in some instances considerable tension forces act on the attachments or paneling elements, which may result in deformation or displacement of the panels and in visual change in the gap- or joint dimensions relative to each other.

Aircraft cabins are all produced with basically the same technological method. All the components, for example, wall paneling elements (window panels, window front panels, ceiling panels) are produced with expensive edge radii, with some of them being suspended three-dimensionally in space. A fixed bearing and a movable bearing ensure mobility during deformation of the fuselage. In this arrangement, however, large movements or deformations of the fuselage become immediately obvious to passengers.

At the lines of separation between the elements or panels, present-day cabin panels (e.g. dado panels or window panels) are connected by means of infill strips, which can result in a joint with a width of between approximately 10 mm and approximately 25 mm in the area arrangement of the adjacent panel. Tolerance compensation as a result of the joint arrangement (infill strip) is clearly visible in all cabins. If the panels were longer and larger, the required tolerance compensation for each gap would be larger and more visible.

Elastic masking elements within or behind the joints, for example piping tapes, are a permanent source of being a nuisance in day-to-day operations as they require regular repairs.

Moreover, the necessary removal, installation, maintenance and repair of the window panels or window front panels represent time-consuming and costly factors in day-to-day operations.

In addition, the components and joints in the spherical regions of a cabin are subject to special requirements, and many of the currently allowable solutions may not take these requirements into account and may not suffice. There needs to be a suitable alternative that can end many of these problems.

SUMMARY OF THE INVENTION

It may be a need to provide a gap covering for cabin panels in an aircraft, which makes possible the simple and reliable covering of joints or gaps.

According to an exemplary embodiment, a gap covering for cabin panels comprises a cover region for at least partially covering a gap between a first paneling element and a second paneling element, wherein the cover region is designed to be affixed between the two paneling elements such that movement of the first paneling element relative to the second paneling element leads to corresponding bending of the cover region, and wherein even in the case of such relative movement, the gap is substantially covered by the cover region of the gap covering.

Tolerances are thus not always compensated for by way of joint width. Instead, tolerance compensation takes place such that displacement of two adjacent wall elements relative to each other results in the gap covering the flexing or stretching. In this arrangement, the gap covering is inserted between the two cabin panels and is connected to them so that said gap covering can follow the changes in the width of the gap in the manner of an elastic element.

The gap covering is thus fixed along the border edges of the adjoining panels such that corresponding flexing can take place at more or less distance of the two paneling elements. If the joint is narrower, the strip is flexed slightly further by the pressure; if the joint is wider, the strip is pulled into a flatter shape by the tension.

This tolerance compensation is visually hardly perceptible. Any deviations in the parallel alignment of the panels may, for example, be visually improved by the panels having a bevelled edge arrangement, in one example.

According to a further exemplary embodiment, the cover region comprises a front surface which forms a substantially flat continuation to the front surfaces of the paneling elements.

The transition between the two paneling elements and the surface of the gap covering is thus substantially continuous. In one example, there is no edge between the front surface of the cover region and the first or second paneling element.

According to a further exemplary embodiment, the gap covering further comprises a first fastening region for fastening the gap covering to the first paneling element, and a second fastening region for fastening the gap covering to the second paneling element.

By a corresponding design of these fastening regions, simple, quick and reliable fastening of the gap covering to the adjacent paneling elements may be ensured.

According to a further exemplary embodiment, the first fastening region comprises a first profile that is designed to engage a first counter profile of the first paneling element. Likewise, the second fastening region comprises a second profile that correspondingly is designed to engage a second counter profile of the second paneling element.

For example, the profiles extend along the entire length of the gap covering.

According to a further exemplary embodiment, the fastening regions are designed to attach the gap covering to the first and second paneling elements by clipping in. This may allow quick and reliable fastening of the gap covering to the adjacent paneling elements. There is no need for any expensive screwing, gluing or other fastening. Consequently the installation time is considerably reduced.

According to a further exemplary embodiment, the cover region substantially comprises an elastic material or consists of an elastic material.

Thus, after installation, the gap covering may exert mechanical tension or pressure on the adjacent paneling elements.

According to a further exemplary embodiment, the cover region comprises a rear of the gap covering that comprises insulation material.

In this way, it can be ensured that the gap between two paneling elements also comprises corresponding sound insulation or thermal insulation.

According to a further exemplary embodiment, the cover region comprises a width between the first paneling element and the second paneling element, where the width varies along the cover region.

This may allow for generation of spring forces of different strength, depending on the point viewed on the cover region. For example, the cover region may be V-shaped or it may have a curved shape such that in the top region, spring forces are generated that differ from those in the bottom region (which may be the narrower region, in one example).

According to a further exemplary embodiment, each of the fastening regions of the gap covering comprises a stiffening in order to prevent the gap covering from bending in the fastening regions. In this way, it can be ensured that the gap covering in the fastening regions does not deform, and thus any mechanical load on the fastening regions is reduced. Likewise, in this way any expansion or spreading of the joint connection can be prevented.

According to a further exemplary embodiment, the gap covering comprises a foil, wherein in each instance the fastening regions of the gap covering comprise a groove to protect an edge of the foil.

According to a further exemplary embodiment, in each instance, the profiles of the fastening regions comprise an inclined surface for the fastening regions to slide on the corresponding paneling element.

In this way the mechanical load acting on the fastening regions can be further reduced and in the case of deviations in the spacing between the panels easier clipping-in of the cover may be allowed.

According to a further exemplary embodiment, a method for installing a first paneling element and a second paneling element in an aircraft is stated. In this arrangement, the method comprises aligning and affixing a first paneling element; hanging a second paneling element and a third paneling element into a supporting structure of the aircraft; arranging a first gap covering between the first paneling element and the second paneling element; arranging a second gap covering between the second paneling element and the third paneling element; and aligning the third paneling element, as a result of which the second paneling element automatically aligns itself between the first aligned fixed paneling element and the third paneling element with the use of a spring force.

By using the spring effect of the gap covering, the installation of the individual paneling elements in the aircraft may thus be significantly facilitated. There is no longer a need to individually install, align and affix the individual elements. Instead, in one example, one may align the first paneling element, followed by corresponding affixation to a corresponding support structure of the aircraft. In one example, the subsequent paneling element or elements are then (automatically) aligned relative to the first paneling element, in that they are connected, in the manner of a spring, to the first element.

According to a further exemplary embodiment, the use of a gap covering in an aircraft may be provided.

According to a further exemplary embodiment, an aircraft with a corresponding gap covering may be provided.

Further exemplary embodiments may be provided.

One advantage of the gap covering is that when it is used in combination with single-frame panels, a significantly reduced number of components may be achieved and allow for reduced costs for tools and maintenance and improved interchangeability.

Another advantage is that the overall visual impression of the cabin is significantly enhanced because it now appears as if cast in one mould (uniform window panels and dado panels).

Another advantage is that the paneling components may be lighter in weight because even with single-frame panels, a good overall visual impression of the cabin may be achieved and single-frame panels may be implemented with the use of thinner sandwich layers.

Yet another advantage, as a result of strips whose width is in the millimeter range, identical panels (if single-frame) may also be installed at slightly differing frame spacing.

Yet another advantage is that the gap covering may be covered with the same foil as is used for the adjacent panels so that at one example, if grooves are one to two millimeters in width, between a sealing strip and the panel are noticeable.

A still another advantage is that if the course of a sealing strip is varied, any deviations in a substantially parallel arrangement of the joints may be hidden.

BRIEF DESCRIPTION OF THE FIGURES

Below, with reference to the figures, preferred exemplary embodiments are described.

In the following description of the figures the same reference characters are used for identical or similar elements.

The illustrations in the figures are diagrammatic and not to scale.

DETAILED DESCRIPTION

The examples described and drawings rendered are illustrative and are not to be read as limiting the scope of the invention as it is defined by the appended claims.

Figure 1:
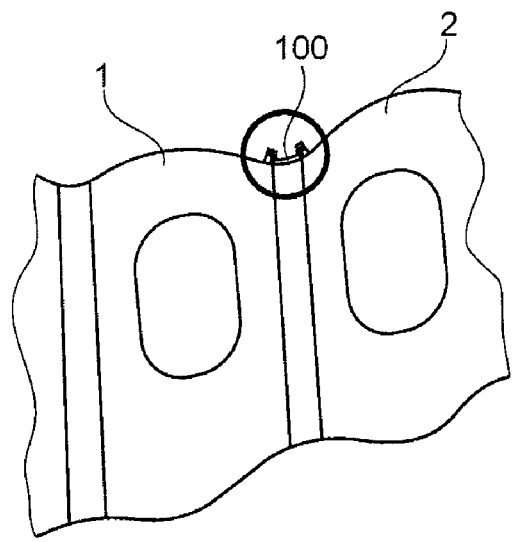
FIG. 1 shows a diagrammatic view of two wall elements with a gap covering, arranged in-between, of varying width according to an exemplary embodiment.

FIG. 1 shows a diagrammatic view of a gap covering 100 that is arranged between two paneling elements 1, 2.

As shown in FIG. 1, the paneling elements 1, 2 are provided in a bent manner, i.e. they comprise a curvature. The gap covering 100 between the two paneling elements 1, 2 is connected to the surfaces of the adjacent paneling elements 1, 2 so as to be substantially flush (or constant).

Figure 2:
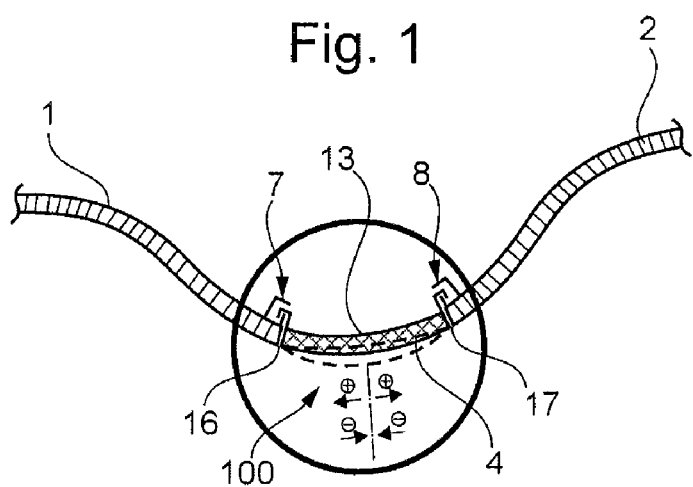
FIG. 2 shows a diagrammatic cross-sectional view of the elements shown in FIG. 1.

FIG. 2 shows a diagrammatic cross-sectional view of the exemplary embodiment of FIG. 1. As shown in FIG. 2, the gap covering 100 comprises a surface 4 that substantially follows on from the front surfaces of the paneling elements 1, 2. There are then only small gaps 16, 17 between the surface 4 and the paneling elements 1, 2.

On the rear of the gap covering, there is an insulation 13, which can, for example, be in the form of foam insulation. In this way, sound protection as well as thermal protection may be achieved.

On its sides, the gap covering 100 comprises fastening regions 7, 8 by means of which the gap covering 100 may be fitted to the paneling elements 1, 2.

Figure 3:
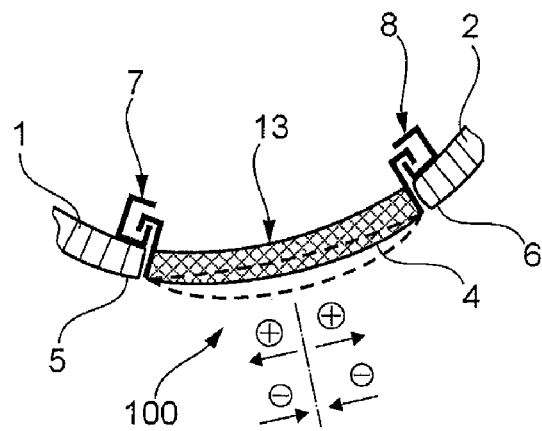
FIG. 3 shows an enlarged diagrammatic cross-sectional view of the elements shown in FIG. 1.

FIG. 3 shows a cross-sectional view of an enlarged detail of the gap covering 100. As shown in FIG. 3, the front surfaces 5, 6 of the paneling elements 1, 2 follow on in a continuous manner as a result of the surface 4 of the gap covering 100. In each instance there is only a small gap between the paneling elements 1, 2 and the gap covering 100.

When a tensile force acts on the gap covering 100, such as for example, when the panels 5, 6 move apart from each other, the gap covering 100 extends. In contrast to the above, when the paneling elements 1, 2 are slid together, the gap covering 100 is pressed together such that its curvature becomes more pronounced (in each instance shown by the dashed lines).

Figure 4:
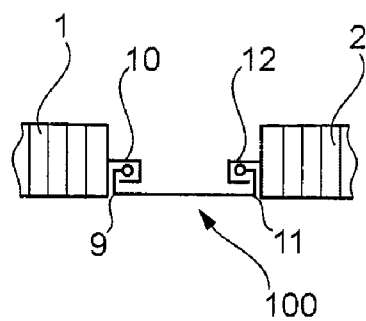
FIG. 4 shows a diagrammatic cross-sectional view of a gap covering between two wall elements according to a further exemplary embodiment.

FIG. 4 shows a diagrammatic cross-sectional view of a gap covering according to a further exemplary embodiment. In this arrangement the gap covering 100 comprises two profiles 9, 11 that engage corresponding counter profiles 10, 12 of the paneling elements 1, 2. This leads to attachment of the gap covering to the paneling elements 1, 2 along the entire line of contact of the elements. In this arrangement, the gap covering is for example, fitted by being clipped from the cabin side to the first paneling element 1 after the paneling element 1 has been aligned and affixed. Subsequently, the second paneling element 2 may then be clipped into the profile 11 of the gap covering 100.

Of course, other fastening types are also possible, for example, crimp connections, plug-type connections, screw connections or gluing.

In another example, one may first align the two paneling elements 1, 2 in relation to each other and to affix them to a supporting structure of the aircraft, and to then attach the gap covering 100.

The gap covering 100 has minimised edge radii and comprises a corresponding decorative foil 901 just like the panelling elements 1, 2, in one example.

Figure 5:
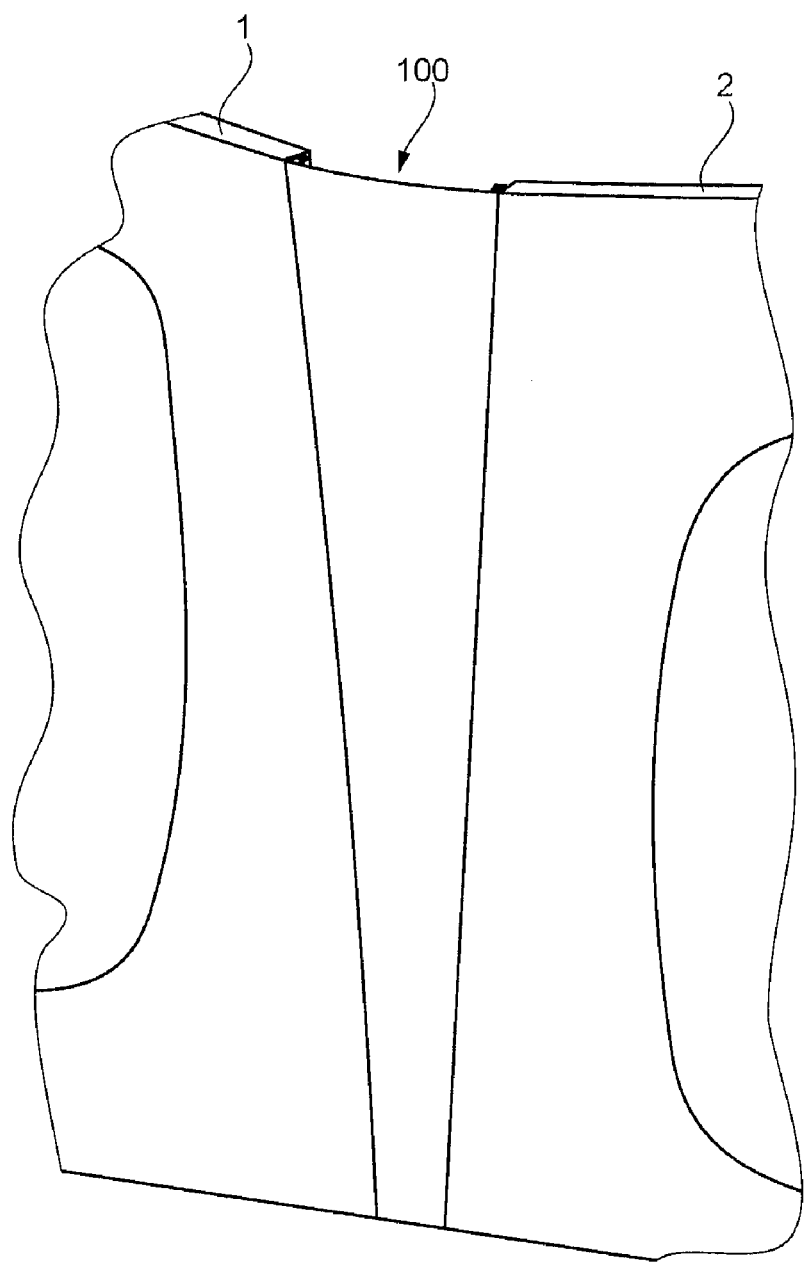
FIG. 5 shows a further exemplary embodiment.

FIG. 5 shows a diagrammatic view of an installed gap covering 100 according to a further exemplary embodiment. In this arrangement, the gap covering 100 is designed in a V-shape and is arranged between the two paneling elements 1, 2. In this arrangement, the course of the gap covering 100 follows the surfaces of the paneling elements 1, 2.

The course and the width of the gap covering 100 match the required tolerance compensation. For example, in the case of large possible tolerances (i.e. displacements) between the two paneling elements 1, 2, the gap covering is relatively wide. In contrast to this, if only relatively small displacements occur, i.e., if only smaller tolerance compensation has to be provided, the width of the gap covering may be correspondingly narrower.

Figure 12:
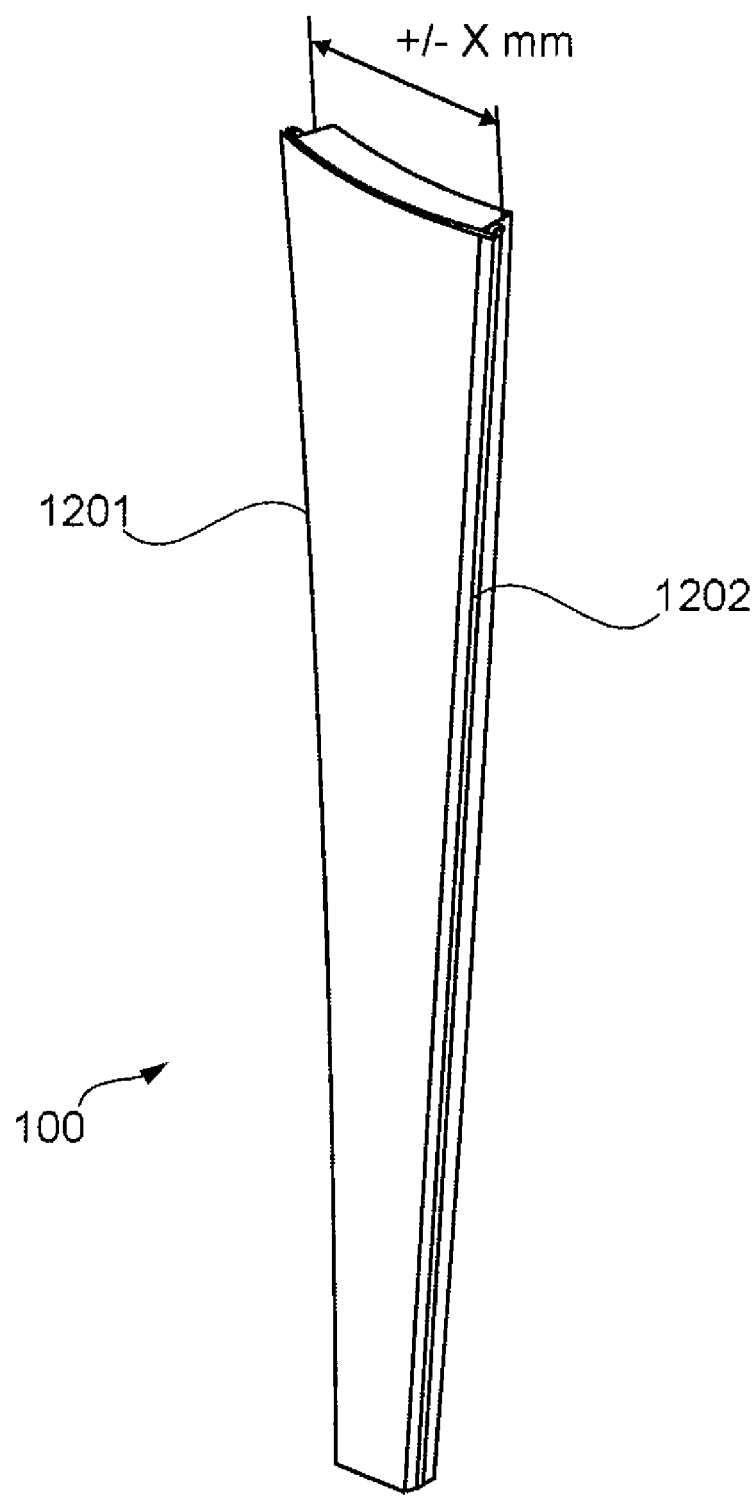
FIG. 12 shows a diagrammatic perspective view of a gap covering according to a further exemplary embodiment.

If larger tolerance compensation is necessary or if the spacing between frames differs, the tolerance compensation or spacings may additionally be compensated for by means of different gradations (e.g. of one millimeter) of the gap coverings, without the need to produce a special panel (see also FIG. 12 (+/−X mm)).

Figure 6:
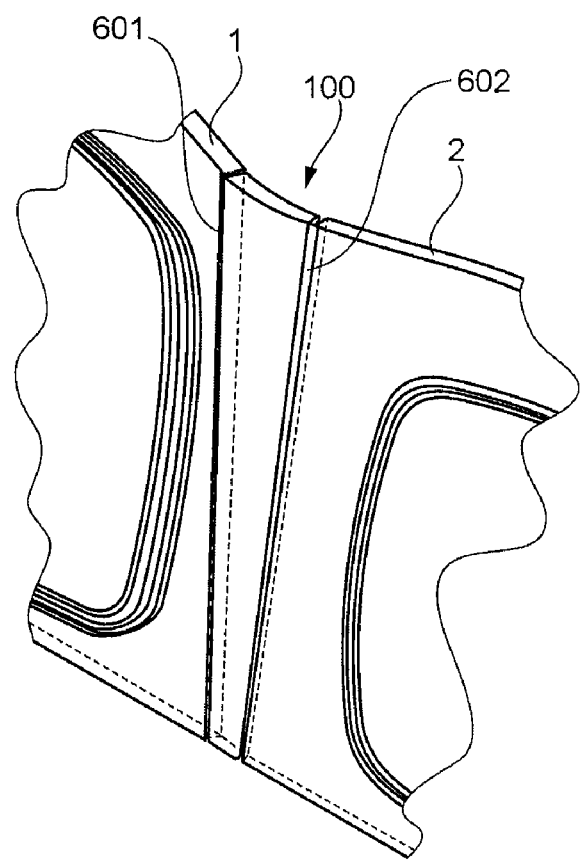
FIG. 6 shows a further exemplary embodiment.

In this arrangement shown in FIG. 6, the width of the gap covering 100 differs in order to visually hide the deviations from a substantially parallel arrangement of the border edges 601, 602 of the paneling elements 1, 2.

Figure 7:
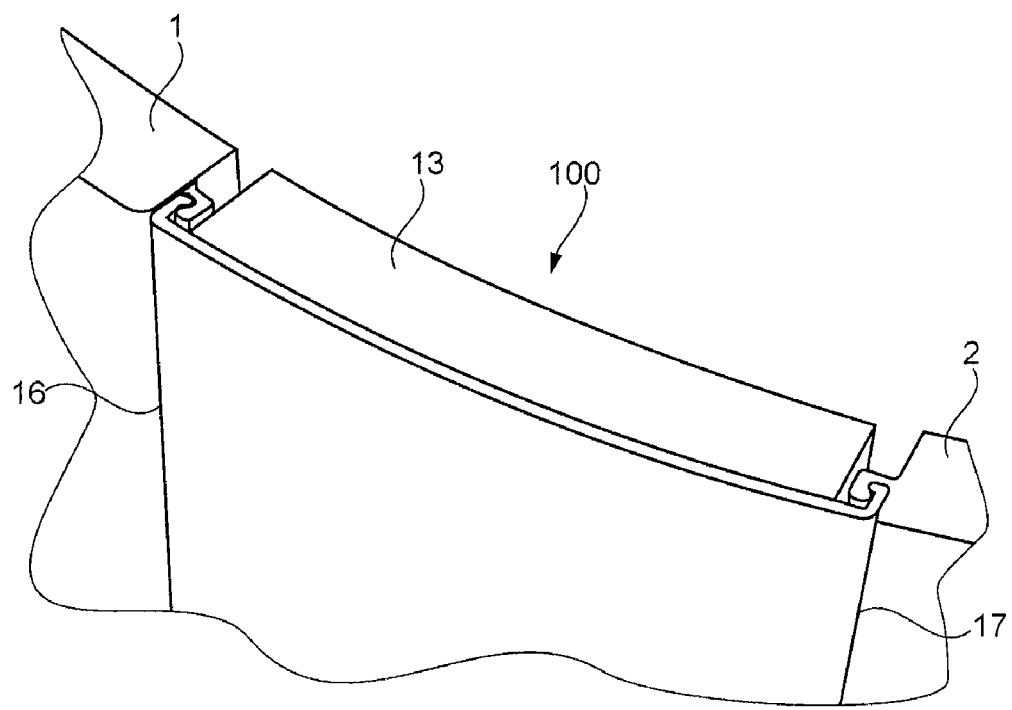
FIG. 7 shows a diagrammatic perspective view of a gap covering between two paneling elements according to a further exemplary embodiment.

As shown in FIG. 7, an insulation 13 has been provided on the reverse of the gap covering 100. Furthermore, FIG. 7 shows that the gaps 16, 17 are very small or have disappeared altogether because the gap covering 100 abuts directly against the paneling elements 1, 2.

Figure 8:
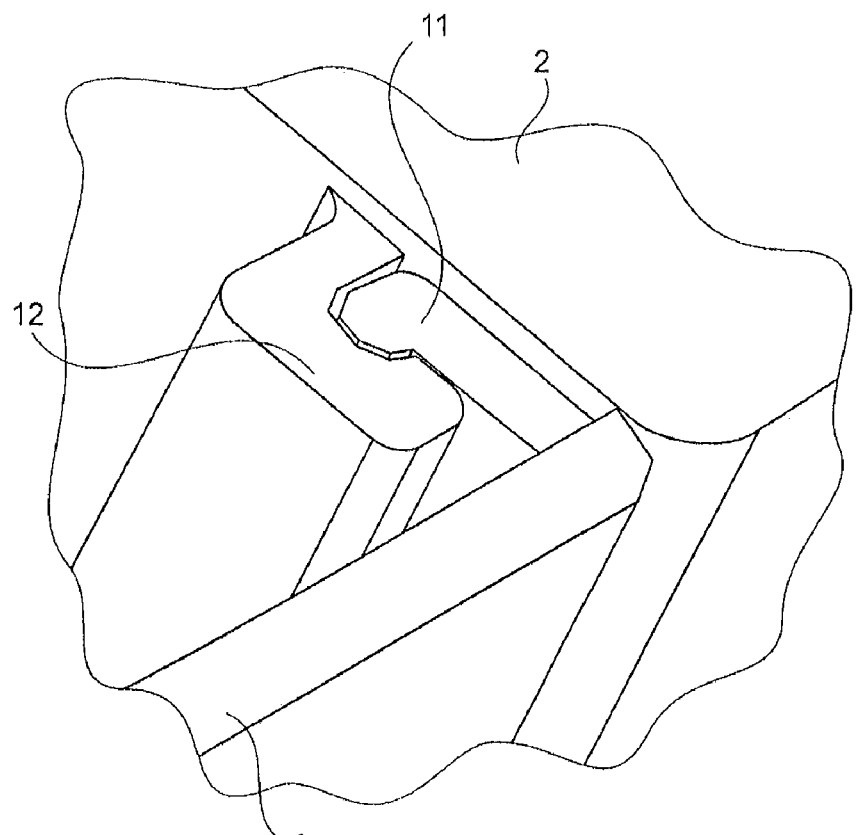
FIG. 8 shows a diagrammatic detail view of a connection between the gap covering and a paneling element according to a further exemplary embodiment.

FIG. 8 shows a detailed diagrammatic view of the fastening region, an example of a connection between the gap covering and the second paneling element 2. The diagram shows the way in which the profile 11 of the gap covering engages the counter profile of the second paneling element 2. The counter profile 12 can be a metal profile or, for example, a plastic profile that has elastic properties so that the profile 11 may be clipped into place. This allows for a fast and safe attachment.

Figure 9:
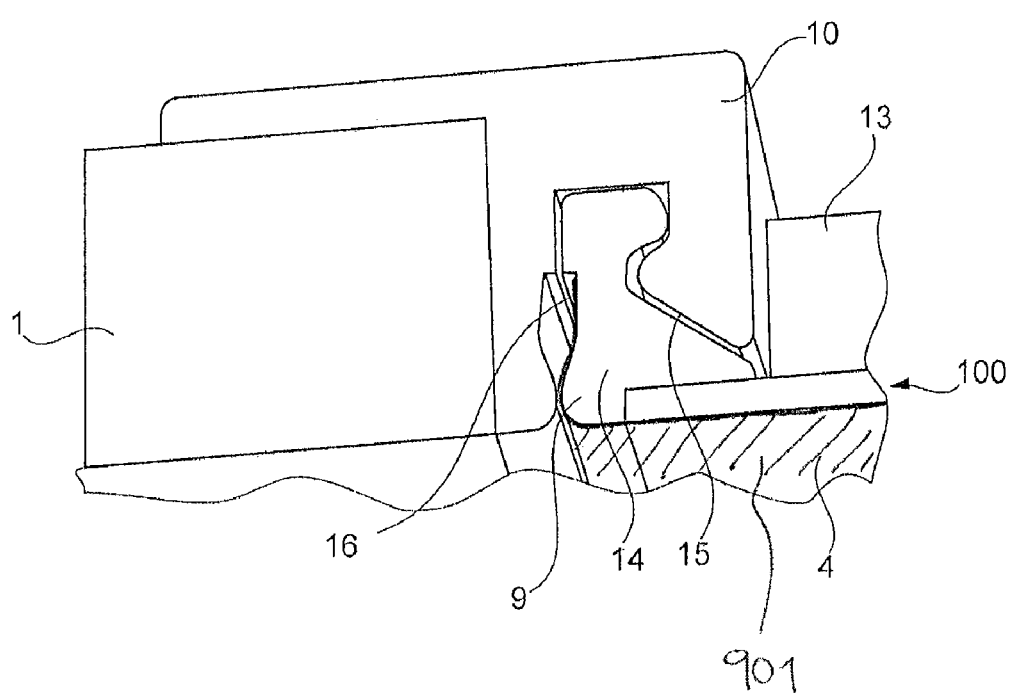
FIG. 9 shows a diagrammatic view of a further connection between a gap covering and a paneling element according to a further exemplary embodiment.

FIG. 9 shows a detailed diagrammatic view of the fastening region, an example of a connection, for fastening to the first paneling element 1. The diagram shows the way the profile 9 of the gap covering 100 locks into a counter profile 10 of the paneling element 1. In particular, an inclined surface 15 is provided which is designed such that the fastening region slides along the counter profile 10 of the paneling element 1. This inclined surface 15 allows for the clip connection to be able to slide, for tolerance compensation, by way of bending.

If, for example, two panels (window panels) are aligned in relation to each other, this happens in relation to the respective structural window; in other words the spacing of the components varies in a positive manner in one case and in a negative manner in the other case. If the spacing is wider in relation to the ideal shape of the cover strip, then inclined surfaces are necessary so that both clip connections of the panels may be made without any great effort. The inclined surface ensures that the strip does not have to be pushed through prior to clipping in. Instead, it finds "its way" into the clip connection independently.

The front 4 of the gap covering 100 may be a flexible plastic layer or a laminate with a corresponding decorative foil 901. The insulation foam 13 too is flexible.

In addition, a stiffening 14 is provided, which helps prevent any bending in the limb region of the gap covering 100. The slot 16 is used to protect the foil edge of the decorative foil 901.

The profiles 9, 10 are, for example, semi-flexible profiles that match the thickness of the material and directly form the edge radii of the covering and of the panel.

Figure 10:
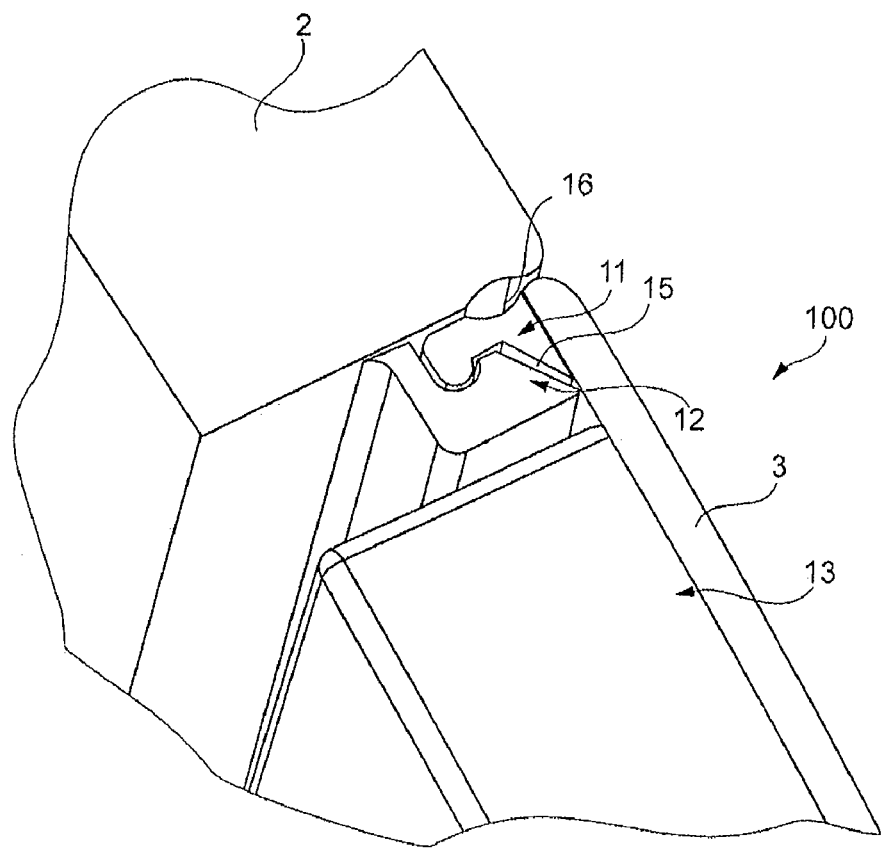
FIG. 10 shows a further diagrammatic view of the connection between the gap covering and the paneling element.

FIG. 10 illustrates the interaction of the two profiles 11, 12 in conjunction with the inclined surface 15 and the slot 16, which assumes a shape of a groove.

Figure 11:
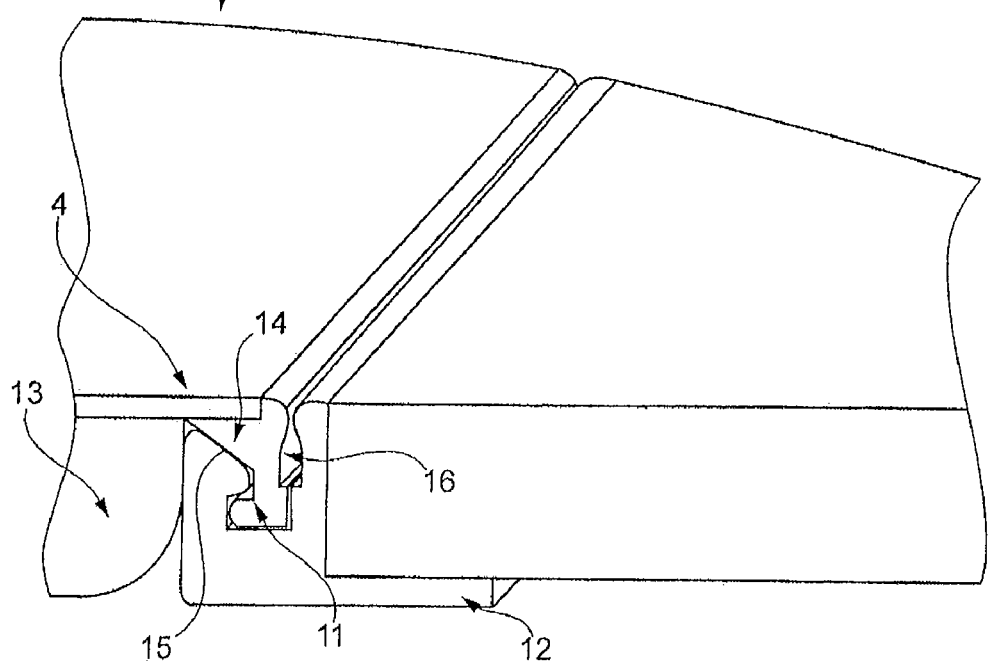
FIG. 11 shows a further exemplary embodiment.

In FIG. 11, the slot 16 comprises a partially angular shape (in contrast to the slot shown in FIG. 10).

In FIG. 12, a three-dimensional view of a gap covering 100 according to an exemplary embodiment. The gap covering 100 shown in FIG. 12 is V-shaped in design. Of course, other designs are also possible. For example, the edges 1201, 1202 of the gap covering 100 may have a curved shape or some other shape.

Figure 13:
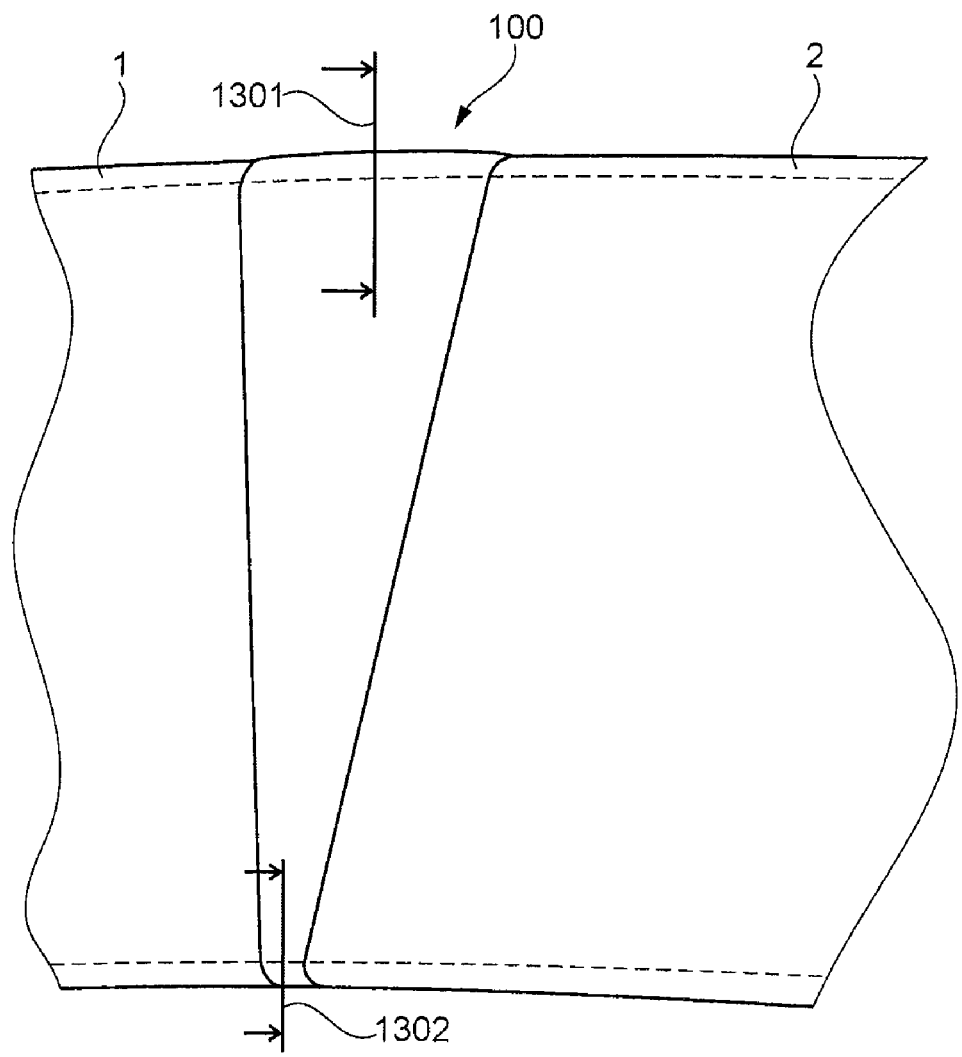
FIG. 13 shows a further exemplary embodiment.

FIG. 13 shows a further exemplary embodiment. In this embodiment, the gap covering 100 is V-shaped in design. The top- and bottom edges are made from a flexible material as panel bordering.

Figure 14:
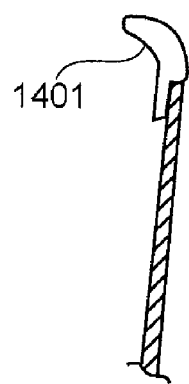
FIG. 14 shows a diagrammatic cross-sectional view of a region of the gap covering shown in FIG. 13.

FIG. 14 shows a diagrammatic cross-sectional view of the top edge or bottom edge of the gap covering shown in FIG. 13 along the section line 1301 or 1302. The panel bordering 1401 may, for example, be slipped on, clipped, glued or screwed into place.

The gap covering provides many advantages which include many that were previously described. For example, in one advantage, as result of strips whose width may be in the millimeter range, identical panels (if single-frame) may also be installed at slightly differing frame spacing. For example, frame spacing of 530 millimeters or 533 millimeters may be lined with identical panels. By providing an appropriate width of the gap coverings, where there is considerable variations in the frame spacing, strong deviation from the ideal shape of the cover strip may be reduced.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

Alternative combinations and variations of the examples provided will become apparent based on this disclosure. It is not possible to provide specific examples for all of the many possible combinations and variations of the embodiments described, but such combinations and variations may be claims that eventually issue

What is claimed is:

1. A gap covering for filling a gap having a varying gap width along the length of the gap, the gap being defined by the space between a first panelling element and a second panelling element in an aircraft, the gap covering comprising:
    a cover region comprised of a front surface varying in width and forming a substantially flush continuation to front surfaces of the first panelling element and the second panelling element for covering the varying gap width of the gap between the first panelling element and the second panelling element;
    a first fastening region extending from a first side portion of the cover region and being adapted for fastening the cover region to the first panelling element and the first fastening region comprises a first profile that is designed to lock into a first counter profile of the first panelling element; and
    a second fastening region extending from a second side portion of the cover region and being adapted for fastening the cover region to the second panelling element and the second fastening region comprises a second profile that is designed to lock into a second counter profile of the second panelling element;
    wherein the cover region is affixed between the first panelling element and the second panelling element, and the cover region arcuately bends when subjected to movement of the first panelling element relative to the second panelling element, such that the front surface of the cover region substantially fills the gap compensatingly filling the varying gap width of the gap between the first panelling element and the second panelling element.

2. The gap covering of claim 1,
    wherein the first fastening region and the second fastening region are designed to attach the cover region to the first panelling element and the second panelling element by clipping in.

3. The gap covering of claim 1,
    wherein the cover region comprises an elastic material.

4. The gap covering of claim 1,
    wherein the cover region comprises a rear of the gap covering that comprises insulation material.

5. The gap covering of claim 1,
    wherein the first fastening region and the second fastening region each include a stiffening device.

6. The gap covering of claim 1, further comprising fastening regions,
    wherein the cover region comprises a foil, and
    the first fastening region, and the second fastening region each comprise a groove to protect an edge of the foil.

7. The gap covering of claim 1, wherein the first fastening region and the second fastening region each comprises a profile having an inclined surface for fastening the first fastening region and the second fastening region each to slide on the first panelling element and the second panelling element, respectively.

8. A method for installing three or more panelling elements in an aircraft with the gap covering of claim 1, comprising the steps of:
    aligning and affixing a first panelling element;
    hanging a second panelling element and a third panelling element into a supporting structure of the aircraft;
    attaching a first gap covering according to claim 1 between the first panelling element and the second panelling element by locking the first profile and the second profile of the first gap covering into the first counter profile of the first panelling element and the second counter profile of the second panelling element, respectively;
    attaching a second gap covering according to claim 1 between the second panelling element and the third panelling element by locking a third profile and a fourth profile of the second gap covering into a third counter profile of the second panelling element and a fourth counter profile of the third panelling element, respectively;
    aligning the third panelling element, such that the second panelling element automatically aligns due to a first spring force between the first panelling element, aligned and fixed in the step of aligning and affixing, and the second panelling element, and a second spring force between the second panelling element and the third panelling element, aligned during the step of aligning the third panelling element.

9. An aircraft using the gap covering of claim 1.

10. An aircraft comprising a gap covering of claim 1.

* * * * *